(12) United States Patent
Lee et al.

(10) Patent No.: US 8,493,923 B2
(45) Date of Patent: Jul. 23, 2013

(54) PATH SWITCHING USING CO-LOCATED RADIOS IN A MULTI-HOP WIRELESS NETWORK

(75) Inventors: Jung Gun Lee, Palo Alto, CA (US);
Sung-Ju Lee, San Francisco, CA (US);
Puneet Sharma, Palo Alto, CA (US);
Raul Hernan Etkin, Oakland, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 321 days.

(21) Appl. No.: 12/848,047

(22) Filed: Jul. 30, 2010

(65) Prior Publication Data
US 2012/0026899 A1    Feb. 2, 2012

(51) Int. Cl.
*H04W 4/00*     (2009.01)

(52) U.S. Cl.
USPC ........................................... 370/329; 370/252

(58) Field of Classification Search
USPC ............ 370/252, 329, 310; 455/39, 82, 426.1
See application file for complete search history.

(56) References Cited

U.S. PATENT DOCUMENTS

| 7,430,164 | B2 | 9/2008 | Bare |
| 7,616,584 | B2 | 11/2009 | Katukam et al. |
| 2008/0095085 | A1* | 4/2008 | Goodjohn ............... 370/310 |
| 2009/0168706 | A1 | 7/2009 | Avonts |
| 2009/0170447 | A1* | 7/2009 | Marlett et al. ............. 455/82 |
| 2009/0257380 | A1 | 10/2009 | Meier |
| 2010/0304737 | A1* | 12/2010 | Jain et al. ............. 455/426.1 |
| 2011/0130092 | A1* | 6/2011 | Yun et al. ................. 455/39 |

OTHER PUBLICATIONS

Giannoulis, A. et al. "Congestion Control and Channel Assignment in Multi-Radio Wireless Mesh Networks" Jun. 2008.

* cited by examiner

*Primary Examiner* — Albert T Chou

(57) ABSTRACT

A node in a multi-hop wireless network includes a master radio and a surrogate radio. The master radio performs data communication on a main multi-hop path in the multi-hop wireless network, and the surrogate radio simultaneously scans one or more channels in the multi-hop wireless network. A channel manager determines if a link between two different nodes on the main multi-hop path is disconnected, and, in response to determining a disconnection of the link between two different nodes on the main multi-hop path, the data communication is switched to an alternative multi-hop path in the multi-hop wireless network based on information obtained from the scanning of the one or more channels.

20 Claims, 7 Drawing Sheets

PATH SWITCHING USING CO-LOCATED RADIOS IN A MULTI-HOP WIRELESS NETWORK

BACKGROUND

Wireless Local Area Networks (WLANs), which may be enterprise networks, wireless mesh networks, first-responder networks, home networks, etc., are highly popular and are widely used in commercial as well as residential environments. A main challenge in providing high performance in wireless networks is overcoming variations in wireless channel conditions. Because of the shared medium, the wireless channel quality varies over time due to contention, interference, fading, etc.

In multi-hop wireless networks, multiple channels are used to minimize interference between each route in the network where different routes in the vicinity use different, non-overlapping channels. The quality of a wireless channel varies over time due to contention, interference, fading, mobility, etc. When a link of a route is disconnected, the route is broken, and rediscovering a new route yields to large service disruption time and incurs large messaging overhead.

For example, in order to find a new route, a wireless system (e.g., an access point and clients in the WLAN) scans other channels after the original route has been determined to be unusable. The scanning is performed on all other channels to find an alternative route. The scanning time is proportional to the number of channels, and the number of channels is very large with new standards, such as 802.11n. Thus, the scanning time is long, which may cause packets on the failed path to be dropped until a new suitable path can be found through the channel scanning.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a surrogate radio is co-located with a master radio in a wireless node in a multi-hop wireless network. The node may include an access point (AP), a mesh AP, a mesh point, etc. This surrogate radio performs channel scanning simultaneously while the master radio is busy with data communication on a multi-hop path in a multi-hop wireless network. If a link between two different nodes in the multi-hop path is disconnected, a new path having a new channel can be immediately selected to bypass the disconnected link without having to wait for a scan of all other channels and paths to be completed. Then, the master radio can switch the data communication to the new path having the new channel without service disruption. In another embodiment, to switch the data communication to the new path, the roles between the master radio and the surrogate radio are swapped so the surrogate radio becomes the new master radio. Then, the data communication commences using the new master. The role switching allows faster migration to the new path. The fast switching provided by the embodiments essentially allows switching without service disruption. Furthermore, path selection for the new path is based on recent scans, so the best path can be selected for switching based on recent channel information obtained from the scans.

Also, according to an embodiment, when operating, for example, in the 5 GHz band, the surrogate radio proactively performs a Channel Availability Check (CAC). Because of an FCC (Federal Communications Commission) regulation, WLANs are required to monitor radar signals in the 5 Ghz UNI-2 band before starting data communication on a channel in the band. The CAC time is required to be at least 60 seconds, so a channel must be monitored for at least 60 seconds for radar signals before switching data communications to the channel. The surrogate radio performs the CAC for each channel prior to determining that a channel switch is needed, so a switch can be made to a new channel without having to wait for the CAC. The CAC is performed periodically for each channel so when a channel switch is needed to use another data communication path a current CAC may have already been performed.

Figure 1:
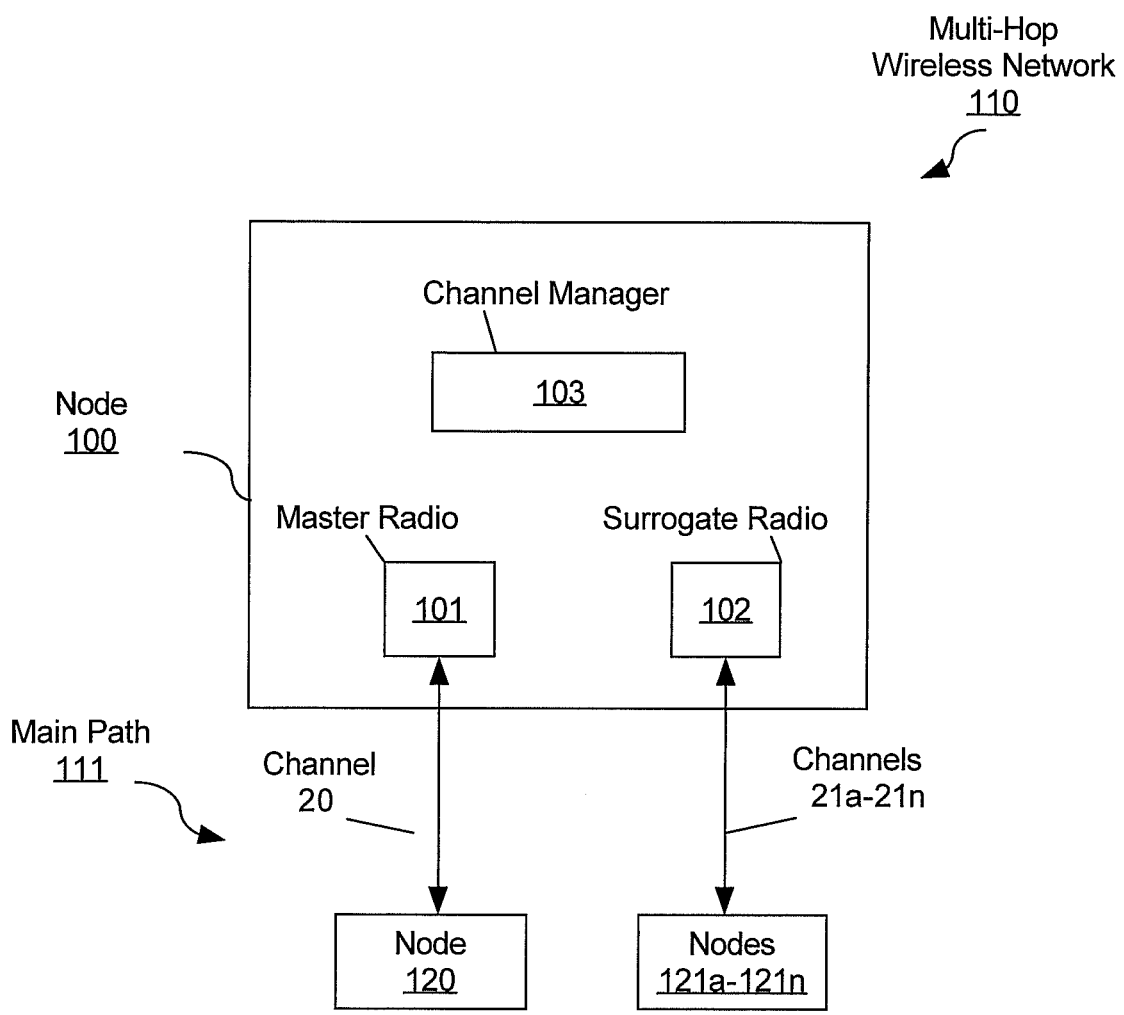
FIG. 1 illustrates a node in a multi-hop wireless network, according to an embodiment.
Figure 2:
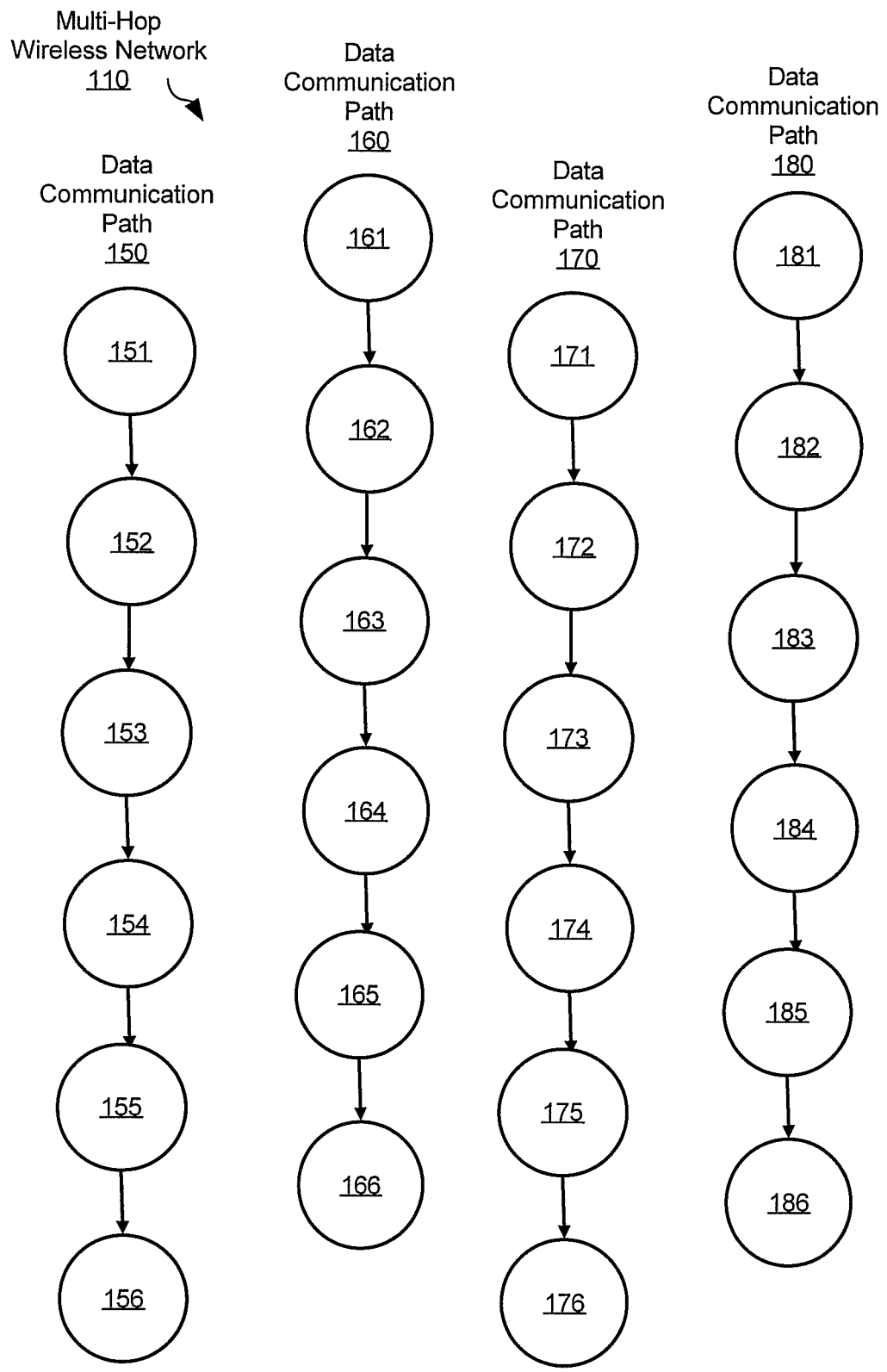
FIGS. 2-5 illustrate data communication paths in a multi-hop wireless network, according to an embodiment.

FIG. 1 illustrates a node 100 in a multi-hop wireless network 110, according to an embodiment. The node 100 includes a master radio 101, a surrogate radio 102, and a channel manager 103. In one embodiment, the node 100 is a multi-radio AP. One radio performs the role of master radio, which includes communicating data between nodes in the network, while the other radio acts as surrogate for channel scanning. A node 120 may connect to the node 100 to send and receive data in the multi-hop wireless network 110. This may include communicating with other network devices in the multi-hop wireless network 110 or other networks. For example, the node 120 can access a destination via the node 100. A node is a device that is operable to connect to the network. Note that the master radio 101 may be connected to multiple nodes for sending and receiving data.

In the multi-hop wireless network 110, a route or a data communication path is multi-hop data communication path from a source to a destination. Multi-hop means that a signal can move from node-to-node and then finally to the source or the destination. In a situation, a source and a destination may be outside the transmission range from each other, and thus, the source and the destination are relying on one or more other nodes in the multi-hop network to relay data packets via the nodes. Multi-hop wireless network allows for continuous connections and reconfiguration by "hopping" from one node to another node until the destination is reached. When nodes are all connected to each other in a multi-hop wireless network, it is a fully connected network. The nodes may all connect to each other via multiple hops. Thus, the nodes are operable to be used as hops in a path.

A radio is an electronic device which transmits wireless signals on a particular channel in the multi-hop wireless network 110. A radio is connected to an antenna to send the wireless signals. The radio may include a chip connected to the antenna that generates the signals to transmit in the multi-hop wireless network 110. Multiple radios can be connected to a single antenna or each radio can have their own antenna. The radio may also be connected to an interface, usually via a wired connection, and the interface is a device that is assigned a MAC (Media Access Control) address and provides layer 1 and/or layer 2 (from the OSI model) data communications in the network. In most instances, the radio and the interface are located in a single network device, such as an AP. The AP or other type of node in the multi-hop wireless network 110 may use a protocol or standard like IEEE 802.11.

The master radio 101 is a radio that provides data communication via a channel of a main path in the multi-hop wireless network 110. The main path may be a path currently being used for data communication, and is shown as main path 111 using channel 20. The data communication includes the exchange of information, such as information in packets, via the wireless medium. The information may include information for applications or data services or any other type of content. A channel is a frequency or a frequency band. Channels may be orthogonal or overlapping.

The surrogate radio 102 is a radio that performs scanning of channels on alternative multi-hop paths in the multi-hop wireless network 110 while data communication is provided by the master radio 101 on the main path 111. Scanning includes determining channel metrics for channels 21a-21n. The metrics may include bandwidth, latency, loss rate, received signal strength (RSS), etc. The surrogate radio 102 may use (and work with) the node 120 to measure the channel metrics. Conventional methods may be used to measure the channel metrics. The scanning may also include performing a CAC for each of the channels. According to an embodiment, information, such as channel metrics for the channels, obtained from the scanning of the channels on multi-hop paths in the multi-hop wireless network 110 may be stored in the channel manager 103 and updated.

The surrogate radio 102 scans the channels 21a-21n and provides the channel manager 103 with a channel report that includes channel metrics and channel busy times and the list of nodes and paths operating on the channels 21a-21n. The channel manager 103 stores the report. The report may include node IDs for neighboring nodes, the channel metrics and busy times, destinations that may be reached through alternative paths including the neighboring nodes, and interference measurements. The channel manager 103 also stores channel metrics for the channel 20 currently being used by the master radio 101 for data communications on the main path 111. These channel metrics may be measured by the master radio 101. Thus, the channel manager 103 may detect a disconnected link on a path currently being used by the master radio 101 for data communications based on the channel report. By way of example, as described above, FIG. 1 shows channel 20 used by the master radio 101, and channels 21a-21n are scanned by the surrogate radio 102. The channel report is stored for channels 21a-21n, and is updated to include channel metrics and CAC results for channel 20 and channels 21a-21n and other information obtained from scanning. Note that the channel numbers shown are simply provided as an example, and the actual channels used and number of channels used may vary.

The channel metrics, including interference metrics, can be measured using other APs, not shown in FIG. 1, in the multi-hop wireless network. Furthermore, conventional measurement techniques may be used to measure one or more of the channel metrics.

The channel manager 103 determines whether the data communications need to be switched to another multi-hop path using another channel. For example, the channel manager 103 may decide to switch to an alternative multi-hop path utilizing another channel because of a disconnection of a link between two different nodes of the current path or performance degradations on the current channel, which can be identified from the channel metrics. Here, the expression, "disconnection of a link between two different nodes" or "disconnected link between two different nodes" includes a condition that renders a link unusable or is about to render a link unusable. This may include poor performance of a link, a failed link due a failed node or other conditions. While determining if a link between two different nodes on the main multi-hop path is disconnected, the channel switching may also be performed in response to identifying a better performing alternative path even if the main path is not disconnected.

In one embodiment, the channel manager 103 selects a new path using the channel metrics measured by the surrogate radio 102. A channel of a new path providing better performance may be identified and the data communication is switched from the main path 111 to the new path, also referred to as an alternative path, which uses one or more of the channels 21a-21n. For example, from the channel report, the channel manager 103 determines channel 21a provides better latency and less interference. Also, the CAC determines there is no radar signal detected for channel 21a (i.e., no interference). Then, the data communication is switched to a new path using the new channel, which is channel 21a in this example. In another embodiment, the channel manager 103 selects a new channel due to a disconnection of a link in the main path 111.

According to an embodiment, the channel manager 103 generates an interference map from the channel report in order to assign a new channel. According to an embodiment, the channel manger 103 requests a node to passively scan a channel for a specified period to detect a list of nodes and measure RSSs from them to build an interference map. The passive scanning includes using a surrogate radio in a network node, which to measure RSSs to build the interference map. The interference map is the interference determined for each path measuring RSS.

The master radio 101 and the surrogate radio 102 are co-located. Co-locating means locating the radios 101 and 102 in the same device or node so they experience the same or similar values for measured channel metrics. This includes providing the radios 101 and 102 in close proximity so the channel metrics measured by one radio, namely the surrogate radio 102, are also applicable to the other radio, namely the master radio 101. If the radios 101 and 102 are far apart, then the channel metrics measured by the surrogate radio 102 may not be applicable to the master radio 101 because of the distance between the radios and resulting difference in channel metrics. This can impact the accuracy of selecting a new channel that provides better performance for the data communication because the channel metrics measured by one radio are not similar to the other. For example, the interference estimated by the surrogate radio 102 should be close to the actual interference experienced by the master radio 101. In one embodiment, the master radio 101 and the surrogate radio 102 are provided in the same device, and are co-located. In other embodiments, the master radio 101 and the surrogate radio 102 may not be in a single device, but they are co-located so they experience the same or similar values for measured channel metrics. Similar may include being within a predetermined threshold or tolerance.

FIGS. 2-5 illustrate data communication paths 150-180 in the multi-hop wireless network 110, according to an embodiment. The data communication path 150 includes nodes 151-156. Each node of the nodes 151-156 is connected to the other node in the same path to make a plurality of links between each node. In this example, the path 160, the path 170, and the path 180 includes nodes 161-166, nodes 171-176, and nodes 181-186, respectively. Each node of the nodes 151, 161, 171, and 181 may be a source and each node of the nodes 156, 166, 176, and 186 may be a destination. According to an embodiment, each path of the data communication paths 150, 160, 170, and 180 is operating on different channels and all nodes in each path use a common channel or common channels using their master radios. According to an embodiment, each path of the multi-hop data communication paths 150-180 does not share any one of the plurality of links with another path. According to an embodiment, each node employs a master radio and a surrogate radio, such as shown in FIG. 1. More or less than four data communication paths, more or less than six nodes for each path, and more or less sources and destinations may exist in the multi-hop wireless network 110. However, only the limited numbers of nodes and paths are shown for illustration purposes.

Figure 3:
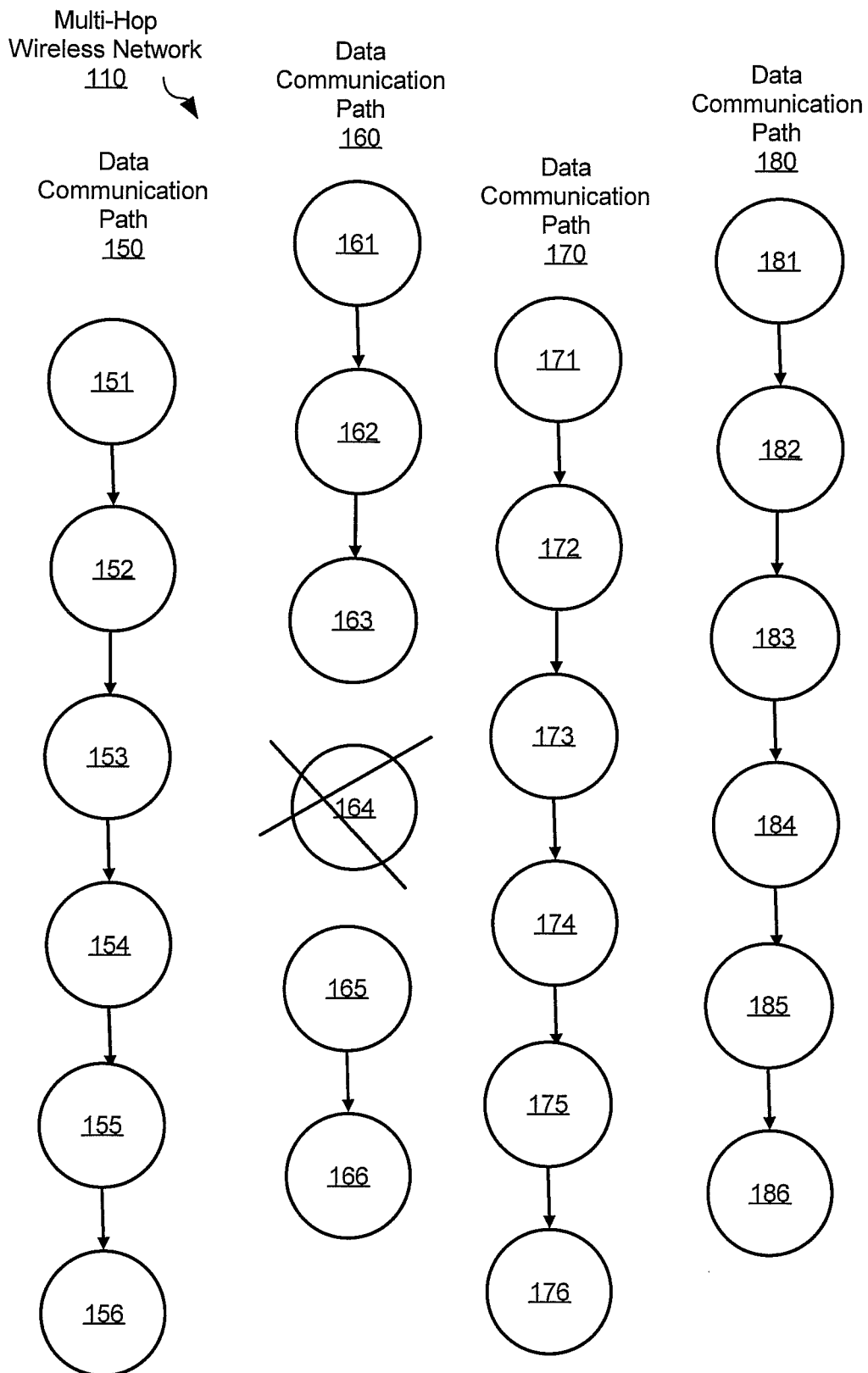

FIG. 3 illustrates a situation where the node 164 fails. The link between the node 163 and the node 164, and the link between the node 164 and the node 165 may fail because the node 164 fails.

According to an embodiment, when a link is disconnected in the path 160, the immediate upstream node (the node 163) of the disconnected link may make the decision of which neighboring node of alternative paths will be used for alternative routing and with the knowledge of which channel that neighboring node is operating on while the master radio of the node 163 performs data communication on the path 160, the surrogate radio of the node 163 continuously scans the different channels for the paths within its communication range to obtains information, such as the channel metrics and other information described above. If a channel manager in the node 163 discovers that the link to the node 164 on the path 160 is disconnected, the channel manager already has up-to-date information on the nearby paths. Therefore, the node 163 may promptly decide the best path to use as an alternative path, without having to perform a long scanning and a route discovery process.

Figure 4:
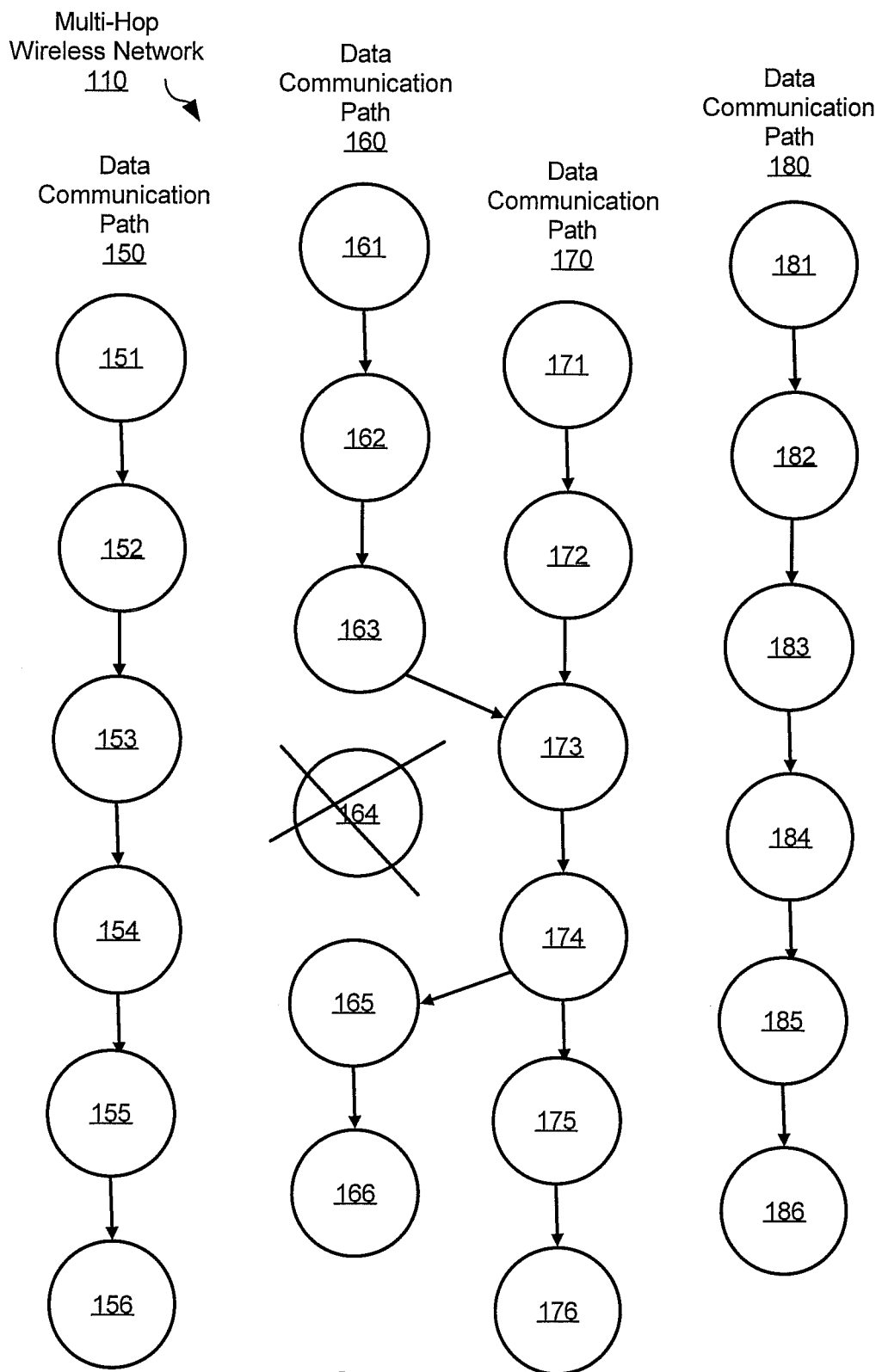

FIG. 4 illustrates an example where data communication is switched from the main path to the alternative path 170 and then switched back to the main path 160 after bypassing the disconnected link. According to an embodiment, as soon as the link to the node 164 is disconnected in the path 160, the node 163 promptly decides that a neighboring node, for instance, the node 173, in the path 170 may be used for an alternative route. Thus, the surrogate radio of the node 163 sends the data to the node 173 using the channel of the path 170. Subsequently, the surrogate radio of the node 174 tunes to the channel for the path 160 to forward the data back to the nodes of the path 160 when it received the packet of path 160 from the node 173. Here, the nodes receiving the data from the node 174 may be downstream of the disconnected link.

Figure 5:
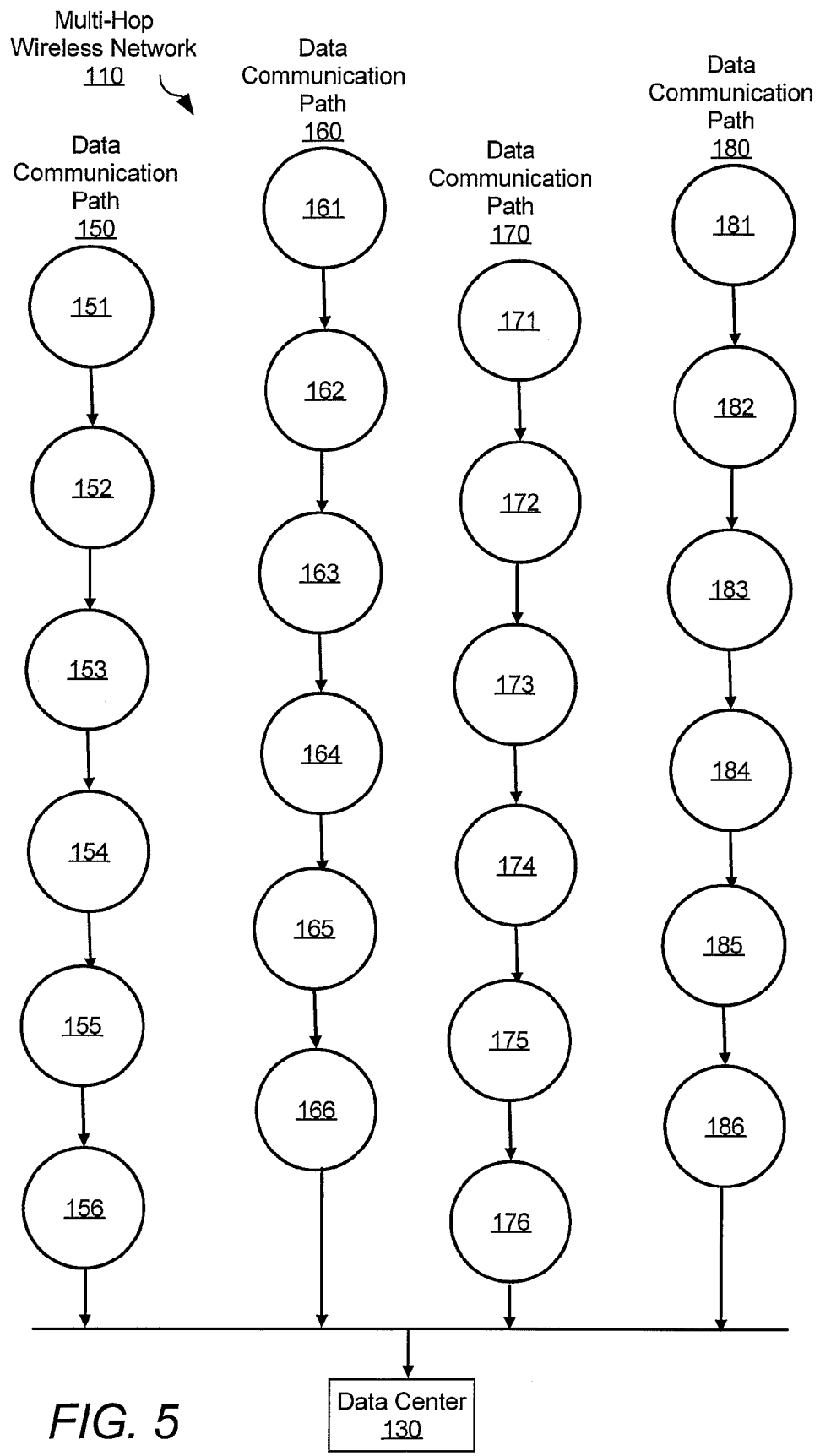

In an embodiment, as shown in FIG. 5, the destinations of the paths 150-180 are connected to each other via a communication bus and to the data center 130. Thus, once the data communications are switched to a new path operating on a new channel, the data communications may not switch back to the original path from the new path because a destination of the new path may include the data center 130.

Figure 6:
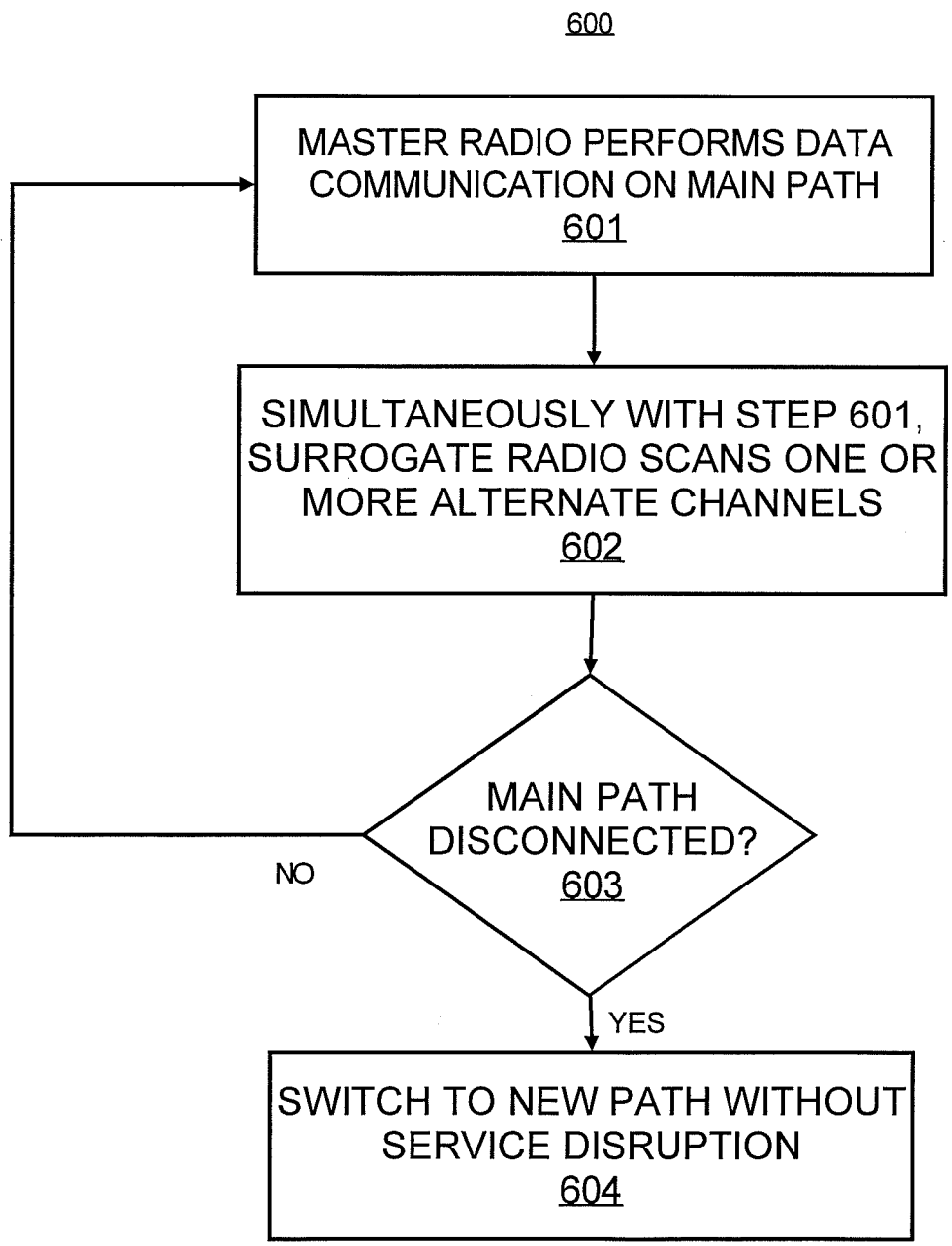
FIG. 6 illustrates a flowchart for data communication path switching, according to an embodiment.

FIG. 6 illustrates a method 600 for data communication path switching in a multi-hop wireless network, according to an embodiment. The method 600 is described by way of example with respect to the system and the network shown in FIGS. 1-5. The method 600 may be practiced in other systems and networks.

At step 601, the master radio 101 co-located with the surrogate radio 102 performs data communication with the node 120 on a main multi-hop path of a plurality of multi-hop paths in the multi-hop wireless network using a channel of the main path, such as the channel 20. Here, the term, "a main path" is a relative term to "an alternative path" and thus, a main path may be any path of the plurality of multi-hop paths. A main path is not necessarily a superior path or a more highly-used path than another path. Each path of the plurality of multi-hop paths includes a plurality of links. In addition, the plurality of multi-hop paths use a plurality of channels.

At step 602, simultaneously with step 601, the surrogate radio 102 scans different channels of other data communication paths and determines channel metrics for one or more alternate of the paths. The channel metrics may be measured and/or received from other nodes. When the surrogate radio 102 scans different channels, the surrogate radio 102 may also determine availability of nodes. According to an embodiment, the surrogate radio 102 may measure interference between the data communication of the main multi-hop path and the data communication of the alternative multi-hop path at each of the nodes while scanning different channels.

At step 603, the channel manager 103 determines if a link between two different nodes on the main multi-hop path is disconnected. A disconnection of a link between two different nodes in the main multi-hop path may be a performance degradation or service disruption on a link of the main path. Performance degradation may result from interference or another metric falling below a threshold.

At step 604, if a link between two different nodes on the main multi-hop path is disconnected, the data communication is switched to a new multi-hop path operating on a new channel without service disruption. The new multi-hop path is selected based on the channel metrics for the one or more alternative channels of the one or more alternative paths. The new multi-hop path is an alternative multi-hop path to the main path. The new multi-hop path may be selected because the new multi-hop path utilizes a channel having the least interference and channel metrics that are satisfactory, for example, above a predetermined threshold. Channel interference may be determined by generating the interference map. Also, a channel is selected based on a CAC, which may be proactively conducted on the surrogate radio to reduce route and channel switching delay.

In an embodiment, the data communications may be optionally switched back to the downstream of the disconnected link of the main multi-hop path from the alternative multi-hop path. Thus, switching the data communications back to the main multi-hop path after bypassing the disconnected link in the main multi-hop path may be performed.

Figure 7:
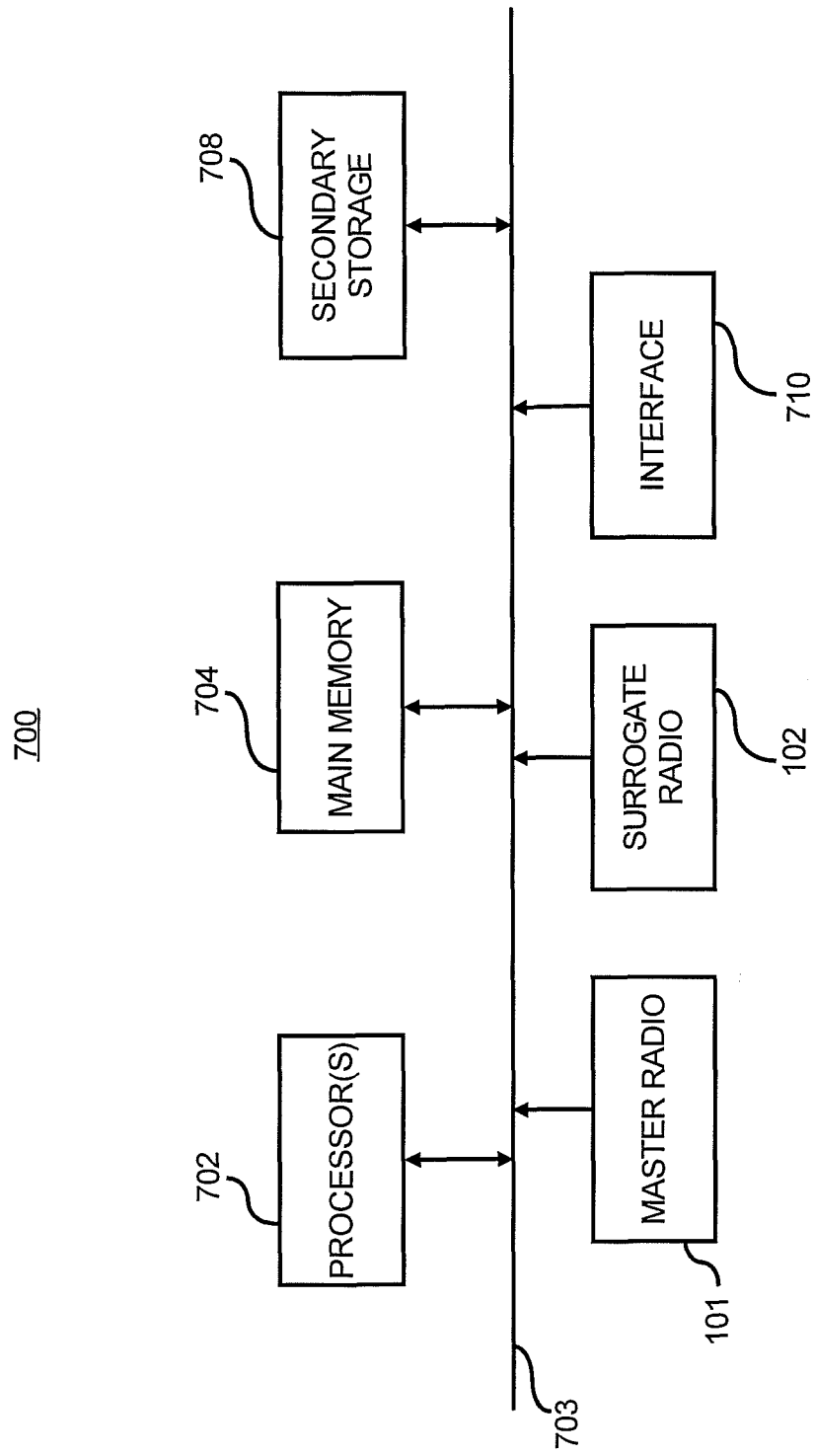
FIG. 7 illustrates a computer system that may be used as a platform for the systems and methods of the embodiments.

FIG. 7 illustrates a block diagram of a general purpose computer system 700 that is operable to be used to execute one or more computer programs implementing the embodiments described herein, including steps described herein. It will be apparent to one of ordinary skill in the art that a more sophisticated computer system is operable to be used. Furthermore, components can be added or removed from the computer system 700 to provide the desired functionality.

The computer system 700 represents a platform for the node 100. The computer system 700 may represent an AP including the node 100. The computer system 700 includes one or more processors or processing circuitry, such as processor 702, providing an execution platform for executing software. Commands and data from the processor 702 are communicated over a communication bus 703. The computer system 700 also includes computer readable storage mediums including a main memory 704, such as a Random Access Memory (RAM), where software is resident during runtime, and a secondary storage 708. The secondary storage 708 may include nonvolatile memory where a copy of the software is stored.

The computer system 700 includes the master radio 101 and the surrogate radio 102. The computer system also includes an interface 710. The interface 710 is connected to the radios 101 and 102 via the communication bus 703 to provide wireless data communications that conforms to a standard or protocol. The radios 101 and 102 may be connected to more than one interface. One interface may be used for data communications and the other for channel measurements.

One or more of the steps of the methods described herein and other steps described herein and one or more of the components of the systems described herein may be implemented as software code stored on a computer readable storage medium, such as the memory and/or secondary storage, and executed on a computer system, for example, by a processor. For example, the steps of the embodiments may exist as software program(s) comprised of program instructions in source code, object code, executable code or other formats for performing some of the steps.

While the embodiments have been described with reference to examples, those skilled in the art will be able to make various modifications to the described embodiments without departing from the scope of the claimed embodiments.

What is claimed is:

1. A method of finding a path for data communication in a multi-hop wireless network including a plurality of multi-hop paths using a plurality of links and a plurality of channels, the method comprising:
performing data communication using a master radio on a main multi-hop path of the plurality of multi-hop paths;
scanning at least some of the plurality of channels in the multi-hop wireless network using a surrogate radio co-located with the master radio to obtain information of the scanned channels;
determining if a link between two different nodes on the main multi-hop path is disconnected based on information obtained from the scanning; and
in response to determining a disconnection of the link between two different nodes on the main multi-hop path, switching the data communication to another node in an alternative multi-hop path in the multi-hop wireless network.

2. The method of claim 1, wherein the scanning using the surrogate radio is performed simultaneously with the performance of the data communication using the master radio, and the switching comprises:
switching the data communication from one node of the two different nodes in the main multi-hop path to the another node in the alternative multi-hop path.

3. The method of claim 1, wherein the information obtained from the scanning comprises channels used by neighbor nodes, destinations that can be reached through multi-hop paths including the neighbor nodes, and channel metrics for the multi-hop paths.

4. The method of claim 1, further comprising:
switching the data communication back to the main multi-hop path from the alternative multi-hop path after bypassing the disconnected link in the main multi-hop path.

5. The method of claim 1, wherein determining if a link between two different nodes on the main multi-hop path is disconnected further comprises:
determining whether there is channel performance degradation or link unavailability on the main multi-hop path.

6. The method of claim 1, wherein switching comprises:
determining channel metrics for each of at least some channels based on the information from the scanning;
measuring interference between the main multi-hop path and a plurality of alternative multi-hop paths; and
selecting the alternative multi-hop path using the channel metrics and the measured interference.

7. The method of claim 6, wherein the channel metrics comprises latency, bandwidth, loss rate, and received signal strength.

8. A node to send and receive data between a source and a destination in a multi-hop wireless network including a plurality of multi-hop paths using a plurality of links and a plurality of channels, the node comprising:
a master radio to perform data communication on a main multi-hop path of the plurality of multi-hop paths;
a surrogate radio co-located with the master radio, the surrogate radio to scan at least some of the plurality of channels in the multi-hop wireless network to obtain information of the scanned channels; and
a channel manager to determine if a link between two nodes on the main multi-hop path is disconnected based on information obtained from the scanning, and, in response to a determination of a disconnection of the link between two nodes on the main multi-hop path, switch the data communication to another node in an alternative multi-hop path in the multi-hop wireless network.

9. The node of claim 8, wherein the channel manager is to switch the data communication back to the main multi-hop path from the alternative multi-hop path after bypassing the disconnected link in the main multi-hop path.

10. The node of claim 8, wherein the channel manager determines whether there is a disconnected link based on channel performance degradation or link unavailability on the main multi-hop path.

11. The node of claim 8, wherein the channel manager determines channel metrics for alternative multi-hop paths based on the information obtained from the scanning and determines whether there is any interference with alternative multi-hop paths based on the information obtained from the scanning, and selects the alternative multi-hop path for switching based on the channel metrics and the interference determination.

12. The node of claim 11, wherein the channel metrics comprises latency, bandwidth, loss rate, and received signal strength for the one or more channels at each of the nodes.

13. The node of claim 11, wherein the surrogate radio measures the interference, the interference including interference between the data communication of the main multi-hop path and data communication on the alternative multi-hop paths.

14. The node of claim 8, wherein each path of the plurality of multi-hop paths includes a source and a destination, and destinations of the plurality of multi-hop paths are connected to each other and a data center.

15. The node of claim 8, wherein the disconnection is between the node and a node downstream of the node in the main multi-hop path.

16. A non-transitory computer readable medium storing computer readable instructions that when executed by a processor performs a method of finding a path for data communication in a multi-hop wireless network including a plurality of multi-hop paths using a plurality of links and a plurality of channels, the computer readable instructions comprising code to:

perform data communication using a master radio on a main multi-hop path of the plurality of multi-hop paths;

scan at least some of the plurality of channels in the multi-hop wireless network using a surrogate radio co-located with the master radio to obtain information of the scanned channels;

determine if a link between two different nodes on the main multi-hop path is disconnected based on information obtained from the scanning; and in response to a determination of a disconnection of the link between two different nodes on the main multi-hop path, switch the data communication to another node in an alternative multi-hop path in the multi-hop wireless network.

17. The non-transitory computer readable medium of claim 16, wherein the code to scan is executed simultaneously with the code to perform the data communication, and the code to switch comprises code to:

switch the data communication from one node of the two different nodes to the another node in the alternative multi-hop path.

18. The non-transitory computer readable medium of claim 16, wherein the information obtained from the scanning comprises channels used by neighbor nodes, destinations that can be reached through multi-hop paths including the neighbor nodes, and channel metrics for the multi-hop paths.

19. The non-transitory computer readable medium of claim 18, wherein the computer readable instructions further comprise code to:

switch the data communication back to the main multi-hop path from the alternative multi-hop path after bypassing the disconnected link in the main multi-hop path.

20. The non-transitory computer readable medium of claim 16, wherein the code to determine if a link between two different nodes on the main multi-hop path is disconnected comprises code to:

determine whether there is channel performance degradation or link unavailability on the main multi-hop path.

* * * * *